United States Patent [19]

Gärtner et al.

[11] 3,957,705
[45] May 18, 1976

[54] ANTI-FOAMING AGENT COMPOSITIONS

[75] Inventors: Jürgen Gärtner, Haan; Rudi Heyden, Hochdahl-Millrath; Michael Eckelt, Dusseldorf-Benrath; Heinz Linden, Dusseldorf-Holthausen; Hans Bornmann, Dusseldorf-Holthausen; Arnold Heins, Hilden, all of Germany

[73] Assignee: Henkel & Cie G.m.b.H., Dusseldorf, Germany

[22] Filed: Apr. 24, 1974

[21] Appl. No.: 463,617

[30] Foreign Application Priority Data

Apr. 30, 1973 Germany............................ 2321755

[52] U.S. Cl.............................. 260/22 R; 106/236; 106/238; 252/321; 260/29.6 MN; 260/551 R
[51] Int. Cl.².................... C09D 5/02; C09F 1/04
[58] Field of Search ..... 260/22 A, 551 R, 29.6 MN, 260/22 R; 252/321; 106/236, 238

[56] References Cited
UNITED STATES PATENTS

| | | |
|---|---|---|
| 1,972,142 | 9/1934 | Goldstein........................ 260/551 R |
| 2,461,730 | 2/1949 | Gunderson............................ 252/321 |
| 2,485,378 | 10/1949 | Gunderson............................ 252/321 |
| 2,540,678 | 2/1951 | Kelley.................................. 252/321 |
| 2,773,041 | 12/1956 | Larsen et al......................... 252/358 |
| 2,773,852 | 12/1956 | Rowe et al........................ 260/551 R |
| 3,494,882 | 2/1970 | Andrews............................ 260/22 A |
| 3,528,929 | 9/1970 | Buckman et al..................... 252/321 |
| 3,629,122 | 12/1971 | Jakobi................................ 252/321 |
| 3,673,105 | 6/1972 | Curtis et al.......................... 252/321 |

Primary Examiner—Ronald W. Griffin
Attorney, Agent, or Firm—Hammond & Littell

[57] ABSTRACT

Anti-foaming agent compositions for use in aqueous synthetic resin or natural resin dispersions, containing a carboxylic acid-N-alkylamide having the formula

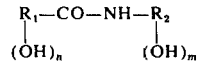

wherein $R_1$ and $R_2$ are alkyls having from 10 to 26 carbon atoms, $n$ and $m$ are integers from 0 to 2, with the proviso that one of $n$ or $m$ is other than 0, dispersed in water or an organic liquid.

12 Claims, No Drawings

ANTI-FOAMING AGENT COMPOSITIONS

THE PRIOR ART

Foam buildup in synthetic resin or natural resin dispersions is annoying in all stages of the production up to the final application. This problem starts already in the production where, due to the necessary intensive mixing processes, the foam buildup can become so great that production is impaired. The next difficulties are then encountered in the filling of the highly foamed material, which is only possible by removing the foam bubbles with a great loss of time. Other difficulties caused by foaming are encountered in the application of the dispersion-based coating materials on the various foundations. If a dispersion paint containing foam bubbles or tending to foam buildup is applied on a foundation, for example, brickwork, wood, etc., and the foam bubbles burst only during the drying, that is, in a stage of film-formation in which the paint can no longer or insufficiently flow, there is increased crater formation. In these craters the paint film is thinner than at the other points of the coated surfaces, or it is missing completely in extreme cases. Such craters provide a particularly favorable opportunity for external influences to attack the coatings and lead to a reduction of the protective action and to premature destruction of the paint film. In a similar manner, foam buildup in printing inks leads to a deterioration of the printed matter.

The foam appearing in the dispersion layers can have gotten there in various ways. It may have been present in the dispersion from the mechanical working during the production. It may have been produced in the dispersion by air escaping from the foundations being coated, for example, air occlusions in wood, paper, textiles, brickwork and other porous materials. It may have been introduced into the coating layer by the incorporating of air by means of the application, for example, felt or sponge paint rollers or brushes.

In order to destroy the foam or to avoid foam buildup, so-called anti-foaming agents or de-aerators are added to the dispersions. Such anti-foaming agents, in addition to silicone oils, are frequently based on solutions or dispersions of suitable active substances, which are mostly of a wax-like consistency, in mineral oil fractions, animal or vegetable oils or other suitable media. Other constituents of these anti-foaming agents are frequently aids for increasing the stability, such as thickeners, like aluminum soaps or finely dispersed silica.

The foam-desroying or foam inhibiting active substances of the anti-foaming agent compositions are primarily polyadducts of ethylene or propylene oxide, fatty acid polyglycol esters, fatty acid partial esters of glycerine and other polyols, such as pentaerythrite, as well as organopolysiloxanes. Frequently mixtures of such foam-inhibitors are utilized.

The agents heretofore used to prevent foaming in synthetic resin or natural resin dispersions, however, have to a varying degree the disadvantages listed below. Common to all these products is the great drop in defoaming effectiveness after prolonged storage in the dispersion produced with them. This drop in effectiveness can have various causes. For example, it may be caused by saponification of the active substances in the aqueous media. This must be expected, particularly when the medium to be protected against foaming is alkaline, as it is the case, for example, in dispersion paints, aqueous printing inks, so-called water flexo paints, and the so-calld water varnishes. Another possible cause for the loss of effectiveness during storage is that the active substances are absorbed by other products which are present in the system. These can be substances with a large surface or great porosity, but also the dispersed resins themselves. In other cases, separation of the anti-foaming agent during storage is responsible for the drop in effectiveness.

Another disadvantage is that some anti-foaming agents, when compounded in synthetic resin and natural resin dispersions, as well as the coatings produced therewith, exhibit defects. Thus, the adhesiveness and the coatability are frequently reduced when organic silicon compounds are used as anti-foaming agents. Frequently, the simultaneous use of silicone oils in anti-foaming agent compositions results in a deterioration of the flow of the dispersion paint an in the formation of so-called fish eyes. Beyond that, the effectiveness both of the organic silicon compounds and of the other agents used heretofore is insufficient in many cases if film-forming aids, such as spreading agents in the form of hydrocarbons are added to the dispersions.

OBJECTS OF THE INVENTION

An object of the present invention is the development of anti-foaming agent compositions which avoid the above-enumerated drawbacks.

Another object of the present invention is the development of anti-foaming agent compositions for use in aqueous synthetic resin or natural resin dispersions comprising a dispersion in a liquid selected from the group consisting of water and organic liquids of from 1% to 50% by weight of said dispersion of a carboxylic acid-N-alkylamide having the formula

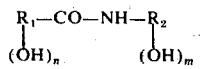

wherein $R_1$ and $R_2$ are possibly hydroxyl-substituted alkyls having from 10 to 26 carbon atoms, $n$ and $m$ are integers from 0 to 2, with the proviso that one of $n$ or $m$ is other than 0.

A further object of the present invention is the development of a stable aqueous synthetic resin or natural resin dispersion containing an effective amount of the above anti-foaming agent composition.

A yet further object of the present invention is the development of, in the process for inhibition of foam development in aqueous synthetic resin or natural resin dispersions which comprises adding a finely dispersed wax-like de-foamer to the aqueous synthetic resin or natural resin dispersions before subjecting them to agitation, the improvement consisting of utilizing a dispersion of from 0.05% to 5% by weight, based on the weight of said synthetic resin or natural resin dispersions of a carboxylic acid-N-akylamide having the formula

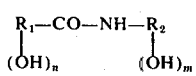

wherein $R_1$ and $R_2$ are possibly hydroxy-substituted alkyls having from 10 to 26 carbon atoms, $n$ and $m$ are integers from 0 to 2, with the proviso that one of $n$ or $m$ is other than 0, as said finely-dispersed wax-like de-foamer.

These and other objects of the invention will become more apparent as the description thereof proceeds

DESCRIPTION OF THE INVENTION

The above drawbacks have been overcome and the above objects have been achieved by the discovery that anti-foaming agent compositions based on a wax-like defoamer dispersed in an organic liquid or in water are particularly suitable for foam inhibition in aqueous synthetic resin and/or natural resin dispersions where the wax-like de-foamer is a carboxylic acid-N-alkylamide having the general formula

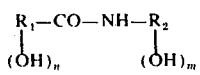

where $R_1$ and $R_2$ denote alkyl radicals with 10 to 26 carbon atoms, and $n$ and $m$ are numbers from 0 to 2, but $n$ and $m$ cannot be zero at the same time.

More particularly, the invention relates to anti-foaming agent compositions for use in aqueous synthetic resin or natural resin dispersions comprising a dispersion in a liquid selected from the group consisting of water and organic liquids of from 1% to 50% by weight of said dispersion of a carboxylic acid-N-alkylamide having the formula

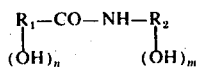

wherein $R_1$ and $R_2$ are possibly hydroxyl-substituted alkyls having from 10 to 26 carbon atoms, $n$ and $m$ are integers from 0 to 2, with the proviso that one of $n$ or $m$ is other than 0; as well as in the process for inhibition of foam development in aqueous synthetic resin or natural resin dispersions which comprises adding a finely-dispersed wax-like de-foamer to the aqueous synthetic resin or natural resin dispersions before subjecting them to agitation, the improvement consisting of utilizing a dispersion of from 0.05% to 5% by weight, based on the weight of said synthetic resin or natural resin dispersions of a carboxylic acid-N-alkylamide having the formula

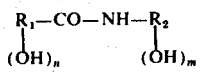

wherein $R_1$ and $R_2$ are possibly hydroxyl-substituted alkyls having from 10 to 26 carbon atoms, $n$ and $m$ are integers from 0 to 2, with the proviso that one of $n$ or $m$ is other than 0, as said finely-dispersed wax-like de-foamer.

The production of the carboxylic acid-N-alkylamide to be used according to the invention is effected in known manner, for example, by reacting carboxylic acids or their esters with the amines, separating the reaction water or the alcohol formed respectively, until practically no free amine is left any more in the reaction mixture. The reaction is carried out generally in a temperature range of from 140° to 190°C, if necessary, with the application of a vacuum.

Since the alkyl moiety of the carboxylic acid or the alkyl moiety of the amine in the carboxylic acid-N-alkylamides to be used according to the invention, or both, must contain one or two hydroxyl groups, there is a wide latitude in the starting materials for the production of the amides. Thus, for example, the acid component can be derived from higher alkyl carboxylic acids containing no hydroxyl groups such as, capric acid, undecylic acid, lauric acid, tridecylic acid, myristic acid, palmitic acid, stearic acid, arachic acid, behenic acid, cerotic acid, as well as mixtures of these acids as they are obtained from natural fats and waxes. The hydroxyl-substituted higher alkyl carboxylic acids are, for example, 12-hydroxystearic acid, 9,10-dihydroxystearic acid, as well as longchained hydroxyalkanecarboxylic acids, such as 3-hydroxytridecanoic acid, which can be obtained by saponifying the corresponding hydroxycarboxylic acid nitriles, as described in pending U.S. patent application Ser. No. 175,773, filed Aug. 27, 1971, abandoned in favor of continuation Ser. No. 406,233, filed Oct. 15, 1973, now U.S. Pat. No. 3,862,204.

The higher alkylamines utilized in the production of the carboxylic N-alkylamides according to the invention are, for example, decylamine, dodecylamine, tetradecylamine, octadecylamine, behenylamine, as well as mixtures of these amines, as they can be obtained from the fatty acid mixtures of natural fats and waxes. The reaction components used as hydroxyl-substituted higher alkylamines, such as β-hydroxydodecylamine, can be obtained by reacting long-chained alkane-1,2-epoxides with ammonia or by hydrogenating long-chained hydroxyalkane-carboxylic acid nitriles.

The carboxyl acid-N-alkylamide according to the invention are for example, lauric acid-β-hydroxyoctadecylamide, stearic acid-β-hydroxy-dodecylamide, 12-hydroxystearic acid-tallow alkylamide, 9,10-dihydroxystearic acid-tallow alkylamide, 12-hydroxystearic acid-β-hydroxydodecylamide.

The starting carboxylic acid and amine in the carboxylic acid-N-alkylamide should preferably be so selected that the melting range of the amides obtained is above 70°C in order to obtain optimum results in the foam control. Particularly suitable are 12-hydroxystearic acid-tallow alkylamide and 9,10-dihydroxystearic acid-tallow alkylamide, in this respect.

The anti-foaming agent composition according to the invention constitutes a fine dispersion of the wax-like carboxylic acid-N-akylamide in an organic or aqueous liquid. Of advantage is a relatively high viscosity of the liquid phase, since it contributes to the stability of the dispersions. The liquid phase can, furthermore, itself have an anti-foaming effect or serve merely as a carrier of the anti-foaming agent.

Suitable organic liquids are those which are liquid in the range of from about 10°C up to at least 100°C, particularly mineral oils with a boiling point of over 140°C, esters of highly branched or unsaturated fatty acids with 8 to 18 carbon atoms with lower alkanols, alkanediols or alkanetriols, for example, ethylene glycol diesters or glycerine triesters of oleic acid, oleyl oleate, also branch-chained or unsaturated liquid fatty acids or fatty alcohols with 8 to 18 carbon atoms, for example, isotridecyl alcohol or oleyl alcohol, also terpene hydrocarbons, such as pine oil, oil of turpentine and similar substances.

It is of advantage to use organic liquids which have a sufficient dissolving power to dissolve the carboxylic acid-N-alkylamides at a high temperature, but below the boiling point of the organic liquid, and to separate the amides again on cooling in finely-dispersed form. This facilitates the production of the anti-foaming compositions according to the invention by heating the components jointly to about 10°C above the melting range of the amide, with subsequent rapid cooling under intensive stirring, whereby extremely fine and stable dispersions are obtained. However, it is also possible to produce the dispersion by stirring the finely ground amide into the liquid phase. The amount of the amide in the antifoaming agent composition based on organic liquids can vary between the limits of 1% to 20% by weight.

Another possibility for the production of the antifoaming agent compositions consists in dispersing the carboxylic acid-N-alkylamides in water with the use of emulsifiers, for example, polyglycol ethers, preferably water-soluble adducts of a hydrophobic moiety having a labile hydrogen and ethylene oxide. The amide portion of the dispersion can amount to from 1% up to 50% by weight. The dispersion thus obtained can then be incorporated in the synthetic dispersions, for example, before further compounding such as for paints. The addition of other distributing agents can then be effected during the further processing, for example, in the form of products which serve as means for improving the film-formation or flow properties. This is convenient, for example, for the production of so-called dispersion paints.

The anti-foaming agent compositions according to the invention have an excellent de-foaming power, which is maintained in the synthetic resin and natual resin dispersions mixed with them. to a surprisingly great extent even after prolonged storage. No harmful side effects, such as deterioration of the adhesion and coatability or adverse effects on the flow and the surface structure of the film are to be observed.

Sometimes, however, it may be of advantage to add to the dispersions of the carboxylic acid-N-alkylamide other known de-foaming substances, such as fats, waxes, fatty acids, alkylene oxide adducts, silicone oils, etc. The de-foaming effect that can be achieved with these combinations is frequently greater than the effect achieved with the individual components.

In order to increase the stability, other substances, for example, thickeners, such as aluminum, calcium or zinc higher fatty acid salts, like aluminum, calcium or zinc stearate, or finely dispersed silica may be added to the dispersions of the carboxylic acid-N-alkylamides. The amounts of these additions vary within the limits of 0.1% to 5% by weight, based on the total dispersion.

The anti-foaming agent compositions according to the invention can be added to the aqueous synthetic resin and natural resin dispersions already during their production or subsequently, for example, to the finished dispersion paint.

As examples of aqueous synthetic resin or natural resin dispersions whose tendency to foaming can be successfully controlled with the compositions according to the invention are polyacrylate dispersions, polystyrene-polybutadiene dispersions, polyvinyl acetate dispersions, polystyrene-polyacrylate dispersions, polyvinyl propionate dispersions, aqueous alkyd resin disperesions, aqueous dispersions containing kolophonium and shellac as well as phenol-formaldehyde resins. The polyacrylate is a polymerizate of a lower alkanol ester of acrylic acid such as methyl acrylate. The amount of anti-foaming agent composition to be added according to the invention depends on the type and foaming tendency of the dispersion to be treated and varies between 0.05% and 5%, preferably 0.1% and 2% by weight, based on the amount of synthetic resin and/or natural resin dispersion present as such, or present in admixture with other paint or varnish ingredients.

The following examples further illustrate the subject of the invention without limiting it, however, to these specific embodiments.

EXAMPLES

The foaming behavior was tested as follows:

TEST 1

200 ml of the resin dispersion to be tested were stirred in a high form glass cylinder for 2 minutes at about 2000 rpm with a dispersing disk of 40 mm diameter. The formation and decreasing of the foam respectively, were measured during the test and reported as follows:

A. Height of foam of the resin dispersion without addition of anti-foaming agent from the upper liqud level to the upper foam limit in cm after stirring for 2 minutes without any addition = 100%.

B. Foam drop of this blank test after 3 minutes indicated in % of A.

C. Time until the foam of the blank test has disintegrated 100% in minutes.

D. Foam formation after stirring for 2 minutes in the presence of the anti-foaming agent, indicated in % of A.

E. The following foam drop after 3 minutes, indicated in % of A.

F. Time until foam has dropped 100%, in minutes following D.

Test 2.

Hard fiber plates of the size 20 × 30 × 0.4 cm were sealed on the smooth side by brushing on a synthetic resin dispersion diluted 1:1. Then 60 to 70 gm of test substance were applied on this plate and so uniformly distributed with a sponge roller that 15 gm of wet test substance (= 250 gm/m$^2$) remained.

The sponge roller used, with a width of 6 cm and a diameter of 7 cm, consisted of open-pored polyurethane foam (type 436, medium, product of Storch, Wuppertal, Germany). The use of such a roller has the advantage that not only the foam bubbles enclosed in the test substance come into play, but also that air is worked in additionally, as it can be seen from the application.

These tests were carried out one day after the production of the resin dispersions, after artificial aging for several days at 50°C, or after storage for 4 months.

The dry films were evaluated on the basis of a comparison scale resulting from many tests. 10 indicates the greatest amount and 1 the smallest amount of bubble formation, or respectively the problems caused by them. Naturally, the surfaces to be evaluated do not always correspond exactly to the comparison scale. Nevertheless, a numerical determination of the antifoaming action is possible this way.

EXAMPLE 1

By reacting 1 mol of technical 12-hydroxystearic acid (acid number = 176) with 1 mol technical tallow amine (derived from technical tallow fatty acid, amine number = 222), 12-hydroxystearoyl-tallow amide, a light yellow wax with an acid number of 2, an amine number of 1, and a melting range of 88° to 92°C was obtained. The production was effected with separation of 1 mol of water by heating to 150° to 190°C.

For the production of the anti-foaming agent compositions according to the invention, 350 parts by weight of the above-mentioned 12-hydroxystearoyl-tallow amide and 50 parts by weight of a fatty alcohol polyglycol ether (oleyl/cetyl alcohol mixture + 20 mols of ethylene oxide) were melted and mixed under intensive stirring at 90°C in portions with 600 parts by weight of practically boiling water. The dispersion obtained was cooled under stirring to room temperature and homogenized in an emulsifying machine at 6000 rpm for 3 minutes. The dispersion produced this way contained the 12-hydroxystearoyl-tallow amide in very fine distribution in an amount of 35% by weight.

0.5 parts by weight of this anti-foaming agent composition in the form of a fine dispersion were incorporated on a roller bank in the course of one hour into 100 parts by weight of a finely-divided synthetic resin dispersion, consisting of 50% polystyrene/methyl acrylate and 50% water (commercial product "Acronal 290 DR", Badische Anilin & Soda Fabrik). 0.5% by weight of a heavy benzine with a boiling range of 180° to 210°C was added to the synthetic resin dispersion as a spreading agent, as it is customary for synthetic resin dispersion paints.

This synthetic resin dispersion mixed with the anti-foaming agents according to the invention was tested for its foaming bahavior one day after it had been prepared and after 4 months storage by diluting samples with water in ratio of 1:1 and subjecting them to Test 1. The values listed in Table I were obtained. For comparison, a blank test sample without anti-foaming agent and 2 samples with commercial anti-foaming agent compositions were included in the tests These samples also contained 0.5% by weight of heavy benzine and 0.5% by weight of the commercial product compound. The blank test sample contained only heavy benzine. The commercial products were:

Product 1: 92.0% mineral oil
1.0% silicone oil
6.5% fatty acid polyethyleneglycol ester
0.5% aluminum soap Product 2: Polyoxypropylene glycol-ethylene oxide adduct.

89.5 parts by weight of mineral oil with a viscosity of 15 cSt and a density of 0.889 and 0.5 parts by weight of aluminum stearate were heated under stirring to 95°C, then 10.0 parts by weight of 12-hydroxystearoyl-tallow amide from Example 1 were introduced. The mixture was cooled under stirring to room temperature. A liquid dispersion containing 10% by weight of the anti-foaming agent was obtained which was used as an anti-foaming agent composition in the dispersion paint whose recipe is listed below:

| Parts by weight | |
|---|---|
| 5.0 | Anti-foaming agent composition, produced as described above. |
| 61.0 | Water |
| 2.0 | Chloracetamide (as a preservative) |
| 2.0 | Nonylphenol polyglycol ether with 9 mols of ethylene oxide. |
| 15.0 | Na hexametaphosphate 10% solution in water |
| 10.0 | Mineral spirits, bp. 140° to 180°C. |
| 8.5 | Ethyleneglycol |
| 105.0 | Methylhydroxypropyl-cellulose 2% solution in water |
| 279.0 | Titanium dioxide, rutile type |
| 76.0 | Heavy spar |
| 128.0 | Calcite |
| 27.5 | Methylhydroxypropyl cellulose 2% solution in water |
| 281.0 | Finely-divided synthetic resin dispersion consisting of 50% of a polystyrene/methyl acrylate and 50% water, as in Example 1 (Acronal 290 D. BASF). |

Parts of this dispersion paint mixed with the above-mentioned anti-foaming agent composition according to the invention were tested for their foaming behavior according to Test 2, one day after the production and after aging for 14 days at 50°C. The values listed in Table II were obtained. For comparison, a blank test sample without anti-foaming agent and 4 samples with commercial anti-foaming agent compositions were included in the tests. The commercial products were:

Product 1: a 20 percent by weight emulsion of organopolysiloxane in water

Product 2: 7 parts by weight mineral oil
12 parts by weight polypropylene oxide-ethylene oxide adduct
10 parts by weight fatty acid, partly as aluminum soap
2 to 4 parts by weight organopolysiloxane Product 3: 87% mineral oil
5% aliphatic ethylene oxide adduct
8% methyl polysiloxane Product 4: 77 parts by weight glycerine monostearate
5 parts by weight methyl polysiloxane
20 parts by weight polyoxyethylene stearate
2 parts by weight silica

TABLE I

| Antifoaming agent compositions | 1 day after production | | | | | | After 4 months storage | | | | | |
|---|---|---|---|---|---|---|---|---|---|---|---|---|
| | A | B | C | D | E | F | A | B | C | D | E | F |
| Without addition | 3.5 | 0 | >30 | — | — | — | 3.5 | 0 | >30 | — | — | — |
| Product 1 | — | — | — | 10 | 100 | 1.3 | — | — | — | 100 | <5 | >30 |
| Product 2 | — | — | — | 135 | 0 | >30 | — | — | — | 145 | 0 | >30 |
| Antifoaming agent compositions according to invention. | — | — | — | 0 | 100 | 0.1 | — | — | — | 0 | 100 | 0.1 |

According to British Patent 689,306

EXAMPLE 2

The anti-foaming agent composition used in this example was produced as follows:

The dispersion paints were diluted for each test to brushing viscosity by an addition of about 20% water.

TABLE II

| Addition | Anti-foaming agent composition | Evaluation according to Test 2 | |
|---|---|---|---|
| | | 1 day after production | After aging for 14 days at 50°C |
| Without | | 10 | 10 |
| 0.5% | Product 1 | 4 | 10 |
| 0.5% | Product 2 | 5 | 9 |
| 0.5% | Product 3 | 2 | 8 |
| 1.0% | Product 4 | 6 | 10 |
| 0.5% | Anti-foaming agent composition according to invention | 3 | 4 |

EXAMPLE 3

From 1 mol of technical 12-hydroxystearic acid and 1 mol of beta-hydroxydodecylamine (amine number 279), the acid amide was prepared in known manner. The reaction product obtained was a wax with a melting range of 98° to 104°C, an acid number of 1.9, and an amine number of 1.2.

7.5 parts by weight of 12-hydroxystearoyl-beta-hydroxydodecylamide were introduced in portions under stirring into a mixture of 92 parts by weight of a heavy benzine with a boiling range of 180° to 210°C and 0.5 parts by weight of aluminum stearate, which mixture was heated to 100°C. The mixture was stirred as it cooled to room temperature. A fine, liquid dispersion of the above-mentiond amide was obtained containing 7.5% by weight of the amide.

7 parts by weight of this anti-foaming agent composition according to the invention were stirred into a water varnish of the following recipe:

| Parts by Weight | |
|---|---|
| 325 | Water-dilutable alkyd resin with an oil content of about 49%, phthalic acid anhydride content of about 19%, acid number 46, modified with isocyanate, 63% solution in butyl glycol (Alkydal F 50 W, Bayer) |
| 18 | Triethylamine |
| 123 | Titanium dioxide, rutile |
| 45 | Strontium chromate |
| 78 | Calcite |
| 72 | Micro-talcum |
| 13 | Driers (Co, Pb, Mn) |
| 5 | Methylethyl ketoxime |
| 25 | Ethylene glycol |
| 10 | n-butanol |

Parts of this water varnish mixed with the antifoaming agent composition according to the invention were subject to Test 1, one day after the production and after aging for 7 days at 50°C. The varnish was standardized with water to 20 seconds flow viscosity (DIN 53211) immediately before the test. For comparison, a blank test sample without anti-foaming agent composition, and 2 samples with commercial anti-foaming agent compositions were included in the tests. The commercial products were:

Product 1:  92% mineral oil
1.0% silicone oil
6.5% fatty acid polyoxyethyleneglycol ester
0.5% aluminum soap Product 2:  94.5% mineral oil
4.1% aluminum soap
1.4% water The values obtained are reported in Table III.

TABLE III

| Amount | Anti-foaming agent compositions | 1 day after production | | | | | | After 7 days aging at 50°C | | | | | |
|---|---|---|---|---|---|---|---|---|---|---|---|---|---|
| | | A | B | C | D | E | F | A | B | C | D | E | F |
| Without | — | 5.4 | 0 | >30 | — | — | — | 6.0 | 0 | >30 | — | — | — |
| 1.0% | Product 1 | — | — | — | >30 | 90 | 8 | — | — | — | 100 | 10 | >30 |
| 1.0% | Product 2 | — | — | — | 90 | 0 | >30 | — | — | — | 100 | 0 | >30 |
| 1.0% | Anti-foaming agent composition according to the invention. | — | — | — | 5 | 100 | 2 | — | — | — | 60 | 100 | 1 |

EXAMPLE 4

1 mol of a technical 9,10-dihydroxystearic acid (acid number = 140, saponification number = 142, OH-number = 329) was reacted with a technical tallow amine (derived from technical tallow fatty acids) in a known manner to give 9,10-dihydroxystearoyl-tallow amide. The resulting amide was a light brown wax with an acid number of 1.3, an amine number of 7.6 and a melting range of above 88°C. 10 parts by weight of the amide was melted by heating in a mixture of 30 parts by weight of butylene glycol and 60 parts by weight of benzine with a boiling range of 180° to 210°. After cooling under stirring, a liquid suspension was obtained which contained 10% by weight of the amide.

The anti-foaming agent composition thus obtained was used in an amount of 0.7% by weight in a dispersion paint similar to Example 2.

Parts of this dispersion paint mixed with the anti-foaming agent composition according to the invention were subject to Test 2 one day after the production and after aging for 7 days at 50°C. The varnish was standardized immediately before the test with the water to brushing viscosity. For comparison, a blank test sample without anti-foaming agent and 2 samples with commercial anti-foaming agent compositions were included in the tests. The commercial products were:

Product 1:  85% mineral oil
5% aliphatic ethylene oxide adduct

```
              8% silicone oil
              2% water
Product 2:  12 parts by weight of polyoxypropyleneglycol
            10 parts by weight of aluminum soap
            76 parts by weight of mineral oil
             2 parts by weight of silicone oil
```

The values obtained are reported in Table IV.

TABLE IV

| Amount added | Anti-foaming agent composition | Evaluation according to Test 2 | |
|---|---|---|---|
| | | 1 day after production | After aging for 7 days at 50°C |
| Without | | 10 | 10 |
| 0.7% | Product 1 | 2 | 8 |
| 0.7% | Product 2 | 4 | 9 |
| 0.7% | Anti-foaming agent composition according to the invention | 2 | 3 |

The foregoing examples show clearly the superiority of the anti-foaming agent compositions according to the invention over the commercial anti-foaming agents.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A stable aqueous synthetic resin or natural resin dispersion containing from 0.05% to 5% by weight based on the weight of said synthetic resin or natural resin dispersion of an anti-foaming agent composition comprising a dispersion in a liquid selected from the group consisting of water and organic liquids of from 1% to 50% by weight of said dispersion of a carboxylic acid -N-alkylamide having the formula

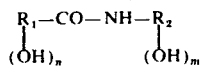

wherein $R_1$ and $R_2$ are alkyls having from 10 to 26 carbon atoms, $n$ and $m$ are integers from 0 to 2, with the proviso that one of $n$ or $m$ is other than 0.

2. The stable aqueous disperson of claim 1 wherein said carboxylic acid-N-alkylamide has a melting range about 70°C.

3. The stable aqueous dispersion of claim 1 wherein said carboxlic acid -N-akylamide is 12-hydroxystearic acid-tallow alkylamide.

4. The stable aqueous dispersion of claim 1 wherein said carboxylic acid-N-alkylamide is 9,10-dihydroxystearic acid-tallow alkylamide.

5. The stable aqueous dispersion of claim 1 wherein said liquid is a mineral oil with a boiling point above 140°C and the amount of said carboxylic acid-N-alkylamide present in said dispersion is from 1% to 20% by weight.

6. The stable aqueous dispersion of claim 1 wherein said liquid is water.

7. The stable aqueous dispersion of claim 6 wherein a polyglycol ether emulsifier is present.

8. The stable aqueous dispersion of claim 1 wherein said anti-foaming agent composition has a further content of from 0.1% to 5% by weight of thickeners.

9. In the process for inhibition of foam development in aqueous synthetic resin or natural resin dispersions which comprises adding a finely-dispersed wax-like de-foamer to the aqueous synthetic resin or natural resin dispersions before subjecting them to agitation, the improvement consisting of utilizing a dispersion of from 0.05% to 5% by weight, based on the weight of said synthetic resin or natural resin dispersions of a carboxylic acid -N-alkylamide having the formula

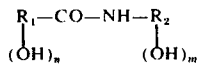

wherein $R_1$ and $R_2$ are alkyls having from 10 to 26 carbon atoms, $n$ and $m$ are integers from 0 to 2, with the proviso that one of $n$ or $m$ is other than 0, as said finely-dispersed wax-like de-foamer.

10. The process of claim 9 wherein said carboxylic acid-N-alkylamide has a melting range about 70°C.

11. The process of claim 9 wherein said carboxylic acid -N-alkylamide is 12-hydroxy-stearic acid-tallow alkylamide.

12. The process of claim 9 wherein said carboxylic acid-N-alkylamide is 9,10-dihydroxy-stearic acid-tallow alkylamide.

* * * * *